US011297225B2

(12) United States Patent
Chen et al.

(10) Patent No.: US 11,297,225 B2
(45) Date of Patent: Apr. 5, 2022

(54) VIDEO PRODUCING METHOD, APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/954,738

(22) PCT Filed: Dec. 19, 2018

(86) PCT No.: PCT/CN2018/121969
§ 371 (c)(1),
(2) Date: Jun. 17, 2020

(87) PCT Pub. No.: WO2019/137166
PCT Pub. Date: Jul. 18, 2019

(65) Prior Publication Data
US 2021/0092285 A1 Mar. 25, 2021

(30) Foreign Application Priority Data
Jan. 10, 2018 (CN) .......................... 201810023876.6

(51) Int. Cl.
*H04N 5/232* (2006.01)
(52) U.S. Cl.
CPC ..... *H04N 5/23222* (2013.01); *H04N 5/23216* (2013.01); *H04N 5/23225* (2013.01); *H04N 5/23229* (2013.01); *H04N 5/232933* (2018.08)

(58) Field of Classification Search
CPC ......... H04N 5/23222; H04N 5/232933; H04N 5/23229; H04N 5/262; H04N 5/225;
(Continued)

(56) References Cited

U.S. PATENT DOCUMENTS 7,525,575 B2\* 4/2009 Rees ...................... G03B 17/00
348/211.4
7,697,827 B2\* 4/2010 Konicek ............ H04N 1/00244
396/56
(Continued)

FOREIGN PATENT DOCUMENTS

CN 101453567 A 6/2009
CN 101740086 A 6/2010
(Continued)

OTHER PUBLICATIONS

Supplementary European Search Report dated Dec. 12, 2020 of 18900093.8 (7 pages).
(Continued)

*Primary Examiner* — Pritham D Prabhakher
(74) *Attorney, Agent, or Firm* — Perkins Coie LLP

(57) ABSTRACT

A video producing method, an apparatus, a storage medium, and an electronic device. The video producing method comprises: acquiring keywords configured by a user, the keywords comprising a participant and a participation event; determining a plurality of photographing tasks according to the keywords, and a trigger condition of each of the photographing tasks; prompting, according to the trigger condition, the user to perform the corresponding photographing task, to obtain at least one photo; and generating a video file according to the at least one photo.

15 Claims, 4 Drawing Sheets

(58) Field of Classification Search
CPC ..... G11B 27/34; G11B 27/031; G11B 27/034; G06Q 30/0601; G06Q 50/184
See application file for complete search history.

(56) References Cited

U.S. PATENT DOCUMENTS

| | | | |
|---|---|---|---|
| 8,564,681 B2* | 10/2013 | Yamamoto | G03B 17/00 |
| | | | 348/222.1 |
| 9,466,296 B2* | 10/2016 | Kaplan | G10L 15/22 |
| 9,651,850 B2* | 5/2017 | Chu | F16M 11/28 |
| 9,706,100 B2* | 7/2017 | Kaneko | H04N 5/23203 |
| 9,848,228 B1 | 12/2017 | Morris et al. | |
| 10,122,535 B2* | 11/2018 | Raduchel | G06F 21/31 |
| 10,269,344 B2* | 4/2019 | Lee | G10L 25/63 |
| 2005/0128311 A1* | 6/2005 | Rees | G03B 17/38 |
| | | | 348/211.99 |
| 2007/0086764 A1* | 4/2007 | Konicek | H04N 5/232933 |
| | | | 396/56 |
| 2010/0220197 A1 | 9/2010 | Dukellis et al. | |
| 2011/0311198 A1 | 12/2011 | Tabe et al. | |
| 2014/0240530 A1 | 8/2014 | Kunishige et al. | |
| 2015/0170652 A1* | 6/2015 | Kaplan | G10L 15/22 |
| | | | 704/246 |
| 2016/0306264 A1* | 10/2016 | Chu | G02B 27/644 |
| 2017/0163866 A1* | 6/2017 | Johnson | G06F 3/011 |
| 2017/0178666 A1* | 6/2017 | Yu | G10L 25/30 |
| 2017/0324926 A1* | 11/2017 | Takimoto | G06F 3/16 |

FOREIGN PATENT DOCUMENTS

| | | |
|---|---|---|
| CN | 101989173 A | 3/2011 |
| CN | 104038693 A | 9/2014 |
| CN | 104349175 A | 2/2015 |
| CN | 104469140 A | 3/2015 |
| CN | 105611207 A | 5/2016 |
| CN | 105765959 A | 7/2016 |
| CN | 106126657 A | 11/2016 |
| CN | 106373170 A | 2/2017 |
| CN | 106878620 A | 6/2017 |
| CN | 106951477 A | 7/2017 |
| CN | 107067450 A | 8/2017 |
| CN | 107273434 A | 10/2017 |
| EP | 2940688 A1 | 11/2015 |

OTHER PUBLICATIONS

IP India, Examination Report for Indian Application No. 202017031373. dated Jul. 27, 2021. 6 pages with English translation.
International Search Report dated Mar. 19, 2019 of PCT/CN2018/121969 (4 pages).
First Office Action of dated Jun. 5, 2020 of Chinese Application No. 201810023876.6 (15 pages).

* cited by examiner

VIDEO PRODUCING METHOD, APPARATUS, STORAGE MEDIUM, AND ELECTRONIC DEVICE

CROSS-REFERENCE TO RELATED APPLICATION

The present application claims the priority of a Chinese patent application filed in the China patent office on Jan. 10, 2018 with the application number 201810023876.6 and the invention name "Video Producing Method, Apparatus, Storage Medium, and Electronic Device", the entire content of which is hereby incorporated by reference.

TECHNICAL FIELD

The present application relates to the technical field of computers, in particular to a video producing method, apparatus, storage medium, and electronic device.

BACKGROUND

With the development of the terminal technology, functions that a terminal can support become more and more powerful. For example, the terminal has a camera, thus being able to support a photographing function.

In many scenes such as traveling or attending a friend's party, etc, a user can use a terminal's photographing function for taking photos. For this kind of photos with the same theme, the user can subsequently make a small video to watch as a memento, but these natural scene themes are relatively limited, and styles of the produced small video are not rich, which is difficult to meet the needs for different users to produce a video.

SUMMARY

Implementations of the present application provide a video producing method, apparatus, storage medium, and electronic device.

An implementation of the present application provides a video producing method, applied to an electronic device, including: acquiring keywords set by a user, wherein the keywords include a participant and a participation event; determining multiple photographing tasks and a trigger condition for each of the photographing tasks according to the keywords; prompting, according to the trigger condition, the user to perform photographing corresponding to a photographing task, so as to obtain at least one photo; and generating a video file according to the at least one photo.

An implementation of the present application provides a video producing apparatus which is applied to an electronic device and includes: an acquiring module, a determining module, a prompting module, a prompting module, and a generating module.

The acquiring module is configured to acquire keywords set by a user, wherein the keywords include a participant and a participation event.

The determining module is configured to determine multiple photographing tasks and a trigger condition for each of the photographing tasks according to the keywords.

The prompting module is configured to prompt, according to the trigger condition, the user to perform photographing corresponding to a photographing task, so as to obtain at least one photo.

The generating module is configured to generate a video file according to the at least one photo.

An implementation of the present application further provides a storage medium, wherein multiple instructions are stored in the storage medium, and the instructions are configured to be loaded by a processor to execute any video producing method described above.

An implementation of the present application further provides an electronic device including a processor and a memory, wherein the processor is electrically connected to the memory, the memory is configured to store instructions and data, and the processor is configured to execute the acts in any video producing method described above.

According to a video producing method, apparatus, storage medium, and electronic device provided by the present application, keywords set by a user are acquired wherein the keywords include a participant and a participation event, and multiple photographing tasks and a trigger condition for each of the photographing tasks are determined according to the keywords. Then, the user is, according to the trigger condition, prompted to perform photographing corresponding to a photographing task so as to obtain at least one photo, and a video file is generated according to the at least one photo. Thereby, videos of various themes can be produced according to user requirements. The method is simple and flexible.

BRIEF DESCRIPTION OF DRAWINGS

The technical solution and other beneficial effects of the present application will be apparent from the following detailed description of the specific implementations of the present application with reference to the attached drawings.

DETAILED DESCRIPTION

Figure 1:
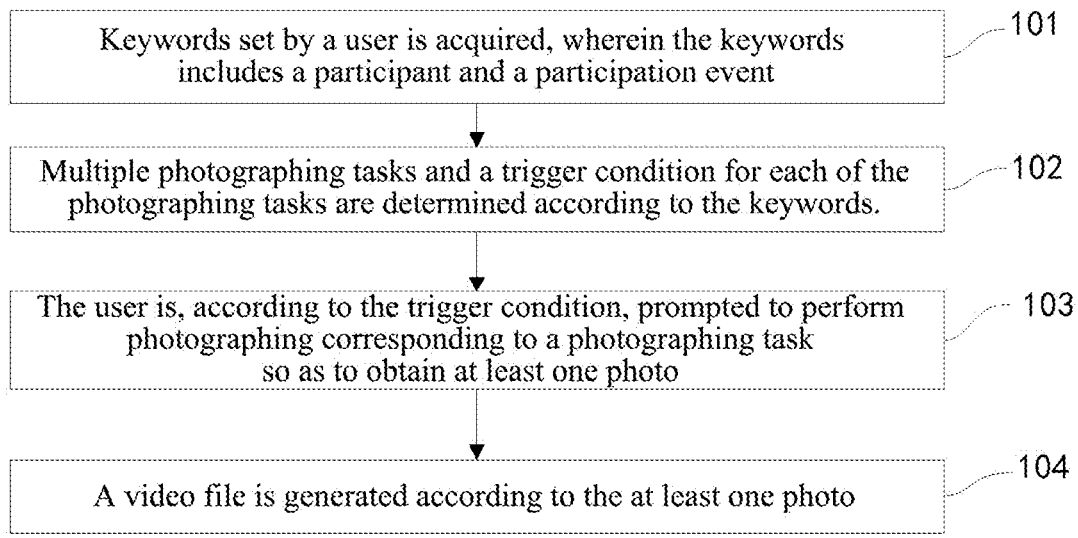
FIG. 1 is a schematic flow chart of a video producing method according to an implementation of the present application.

The following clearly and completely describes technical solutions in implementations of the present application with reference to accompanying drawings in the implementations of the present application. Apparently, the described implementations are merely a part rather than all of the implementations of the present application. All other implementations obtained by a person skilled in the art based on the implementations of the present application without creative efforts shall fall within the protection scope of the present application.

Implementations of the present application provide a video producing method, apparatus, storage medium, and electronic device.

A video producing method, applied to an electronic device, includes: acquire keywords set by a user, wherein the keywords include a participant and a participation event; determining multiple photographing tasks and a trigger condition for each of the photographing tasks according to the keywords; prompting, according to the trigger condition, the user to perform photographing corresponding to a photographing task, so as to obtain at least one photo; and generating a video file according to the at least one photo.

In some implementations, determining the multiple photographing tasks and the trigger condition for each of the photographing tasks according to the keywords includes: matching the keywords with preset at least one script summary; searching for corresponding multiple photographing tasks according to a script summary successfully matched; and extracting photographing background information from each photographing task, and generating a corresponding trigger condition according to the photographing background information.

In some implementations, the trigger condition includes a time condition, a geographical condition and/or a weather condition, and prompting, according to the trigger condition, the user to perform photographing corresponding to the photographing task includes: acquiring current time, current geographical position and/or current weather; detecting whether the current time, the current geographical position and/or the current weather meet the trigger condition; and if yes, generating a prompt interface displaying the photographing task to prompt the user to start a camera for photographing.

In some implementations, after generating the prompt interface displaying the photographing task, the method further includes: acquiring a current environment parameter; determining a photographing parameter of the electronic device according to current environment parameter; and performing photographing with the photographing parameter when the electronic device enters a photographing application.

In some implementations, determining the photographing parameter of the electronic device according to current environment parameter includes: determining a parameter range to which the current environment parameter belongs; and acquiring a corresponding photographing parameter according to the determined parameter range.

In some implementations, generating the video file according to the at least one photo includes: splicing the at least one photo according to photographing time to obtain an animation file; acquiring an audio file set by the user; and synthesizing the animation file and the audio file into a video file.

In some implementations, splicing the at least one photo according to the photographing time includes: determining the quantity of the at least one photo; selecting an animation template corresponding to the quantity; and filling the at least one photo into the animation template in a mapping mode.

FIG. 1 is a schematic flow chart of a video producing method according to an implementation of the present application, which is applied to an electronic device. As shown in FIG. 1, the specific process may be as follows:

101. Keywords set by a user are acquired, wherein the keywords include a participant and a participation event.

In the implementation, the keywords are set by the user according to requirements and mainly used to summarize the subject content of the script to be photographed. The participation event may include: growth memorial, travel memorial, dog walking, wedding memorial, etc. The participant mainly refers to the photographed object, such as a child, a parent, a puppy, or another character or animal.

102. Multiple photographing tasks and a trigger condition for each of the photographing tasks are determined according to the keywords.

For example, the above act 102 may specifically include: matching the keywords with preset at least one script summary; searching for corresponding multiple photographing tasks according to a script summary successfully matched; and extracting photographing background information from each photographing task, and generating a corresponding trigger condition according to the photographing background information.

In the implementation, the script summary is mainly used for briefly describing the main contents of the script, which may include a script theme, a main plot, main characters, etc. The script summary and the photographing tasks can be obtained from the network scripts of the existing film and television drama works, or it can be a photographing template set artificially. The photographing background information may include weather, age, location, etc. For example, when a photographing task is to photograph a picture of a baby crawling at the age of one year, the extracted background information may be 1 year old. In this case, for this photographing script, the user may be required to input the actual age of the baby in advance, the timing function may be turned on, and the interval between the actual age and 1 year old may be taken as the timing duration satisfying the condition to generate a trigger condition.

103. The user is, according to the trigger condition, prompted to perform photographing corresponding to a photographing task so as to obtain at least one photo.

For example, the trigger condition includes a time condition, a geographical condition and/or a meteorological condition. In this case, the above act 103 may specifically include: acquiring current time, current geographical position and/or current weather; detecting whether the current time, the current geographical position and/or the current weather meet the trigger condition; and if yes, generating a prompt interface displaying the photographing tasks to prompt the user to start a camera for photographing.

In the implementation, the trigger condition may be related to time, place and/or weather, which may be directly set by the user or determined according to the photographing tasks. For example, the time may be July 31 each year, the place may be a park or cafe, the weather may be sunny or rainy, etc., and the detail depends on the actual needs of the user. When the trigger condition is met, an electronic device can automatically generate a prompt interface. The prompt interface can include a script photographing progress display column, a script summary display column and the like in addition to a display column of the photographing task, so that the user can better understand the whole photographing content. Of course, in order to facilitate the user to quickly enter the photographing application for photographing, the prompt interface can also include a photographing application entry interface, and the entry interface can take the form of a camera icon and the like.

It is easy to understand that, since the user is not convenient for photographing every time the prompt interface is displayed, when it is detected that the user has rejected photographing of the current photographing task, a selection box for determining the next prompt time can be provided for the user to select a suitable time for photographing again.

The next prompt time in the selection box can be set by default, for example, one hour later, tomorrow or two days later, or it can be randomly set by the user according to his own situation. After it has been set, the electronic device will start the timing function.

In addition, when the electronic device enters the photographing application for photographing, the photographing parameter can also be automatically adjusted according to the brightness of the ambient light brightness. In other words, after the above act 103, the video producing method may further include: acquiring a current environment parameter when an electronic device enters a photographing application; adjusting a photographing parameter of the electronic device according to current environment parameter; and performing photographing by using the adjusted photographing parameter.

In the implementation, the environment parameter mainly includes natural factors that affect the photographing effect, such as ambient light brightness, light intensity and light contrast, etc. The photographing parameter mainly refers to exposure, filter type, color softness, etc. When the environment parameter is obtained, the parameter range to which the environment parameter belongs can be determined first, and then the corresponding photographing parameter can be acquired according to the determined parameter range.

104. A video file is generated according to the at least one photo.

For example, the above act 104 may specifically include: splicing the at least one photo according to photographing time to obtain an animation file; acquiring an audio file set by the user; and synthesizing the animation file and the audio file into a video file.

In the implementation, when it is detected that all photographing tasks have been completed, the electronic device can automatically and sequentially splice static photos into a dynamic animation file according to the photographing time. Specifically, an appropriate animation template can be obtained according to the quantity of photos, and then the photos are filled into the animation template in a mapping mode. Of course, during the filling process, annotation words about the photographing task can also be generated on a static photo. For instance, when a certain photo is a photo of a baby crawling at the age of one year, words such as "1 year old" can be annotated on the photo. The audio file can be downloaded by the user on the Internet or recorded by the user himself.

From the above, it can be seen that the video producing method provided by the implementation is applied to an electronic device. In the method, keywords set by a user are acquired, wherein the keywords include a participant and a participation event. Multiple photographing tasks and a trigger condition for each of the photographing tasks are determined according to the keywords. Then, the user is, according to the trigger condition, prompted to perform photographing corresponding to a photographing task so as to obtain at least one photo, and a video file is generated according to the at least one photo. Thereby, videos of various themes can be produced according to user requirements. The method is simple and flexible.

This implementation is described from the perspective of a video producing apparatus. Specifically, the detailed description is performed by taking a video producing apparatus integrated in an electronic device as an example.

Figure 2:
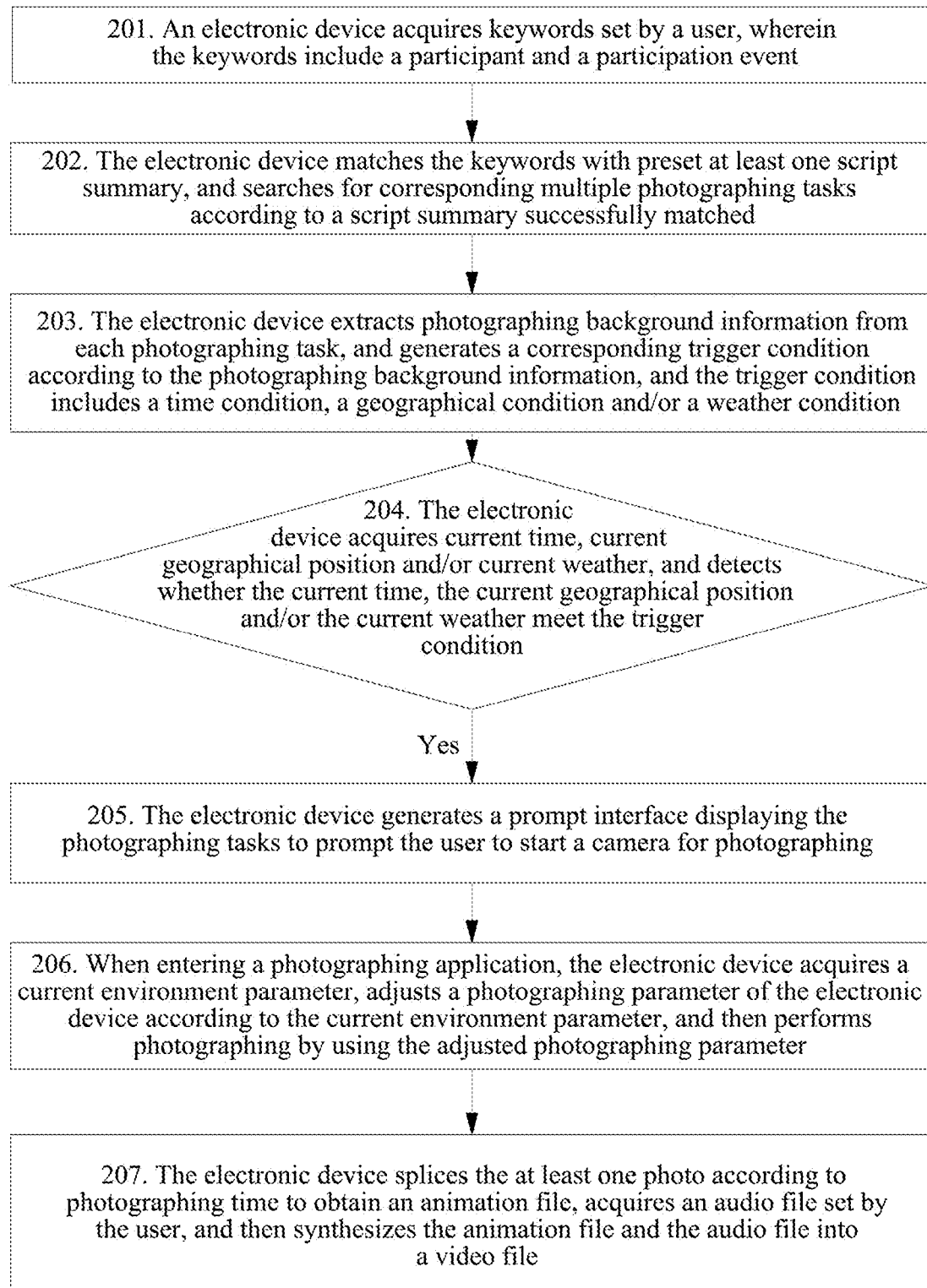
FIG. 2 is another schematic flow chart of a video producing method according to an implementation of the present application.

Referring to FIG. 2, a video producing method is applied to an electronic device, and the specific process may be as follows:

201. An electronic device acquires keywords set by a user, wherein the keywords include a participant and a participation event.

202. The electronic device matches the keywords with preset at least one script summary and searches for corresponding multiple photographing tasks according to a script summary successfully matched.

Figure 3:
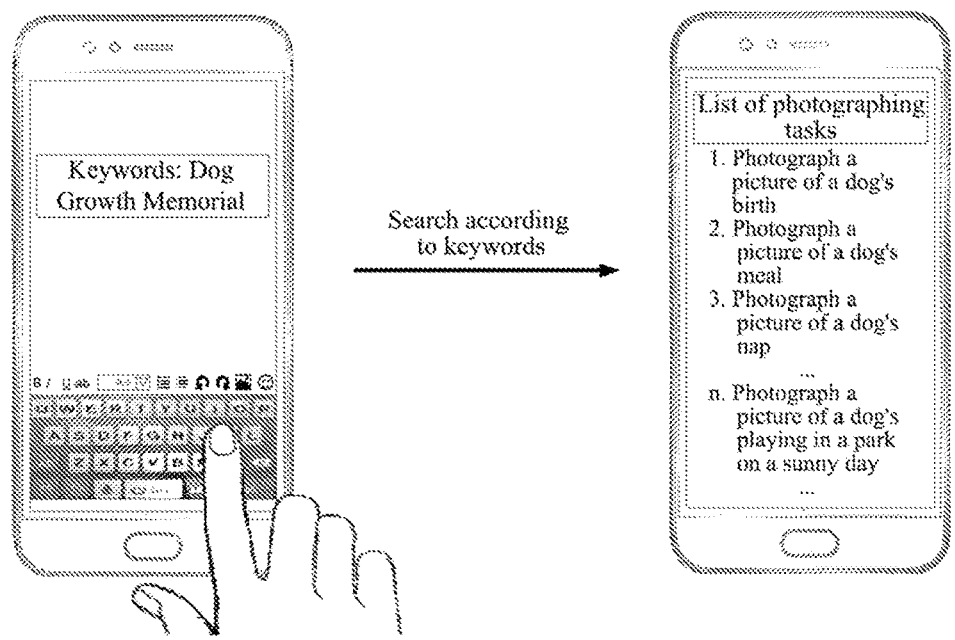
FIG. 3 is a schematic diagram of a script setting interface in an electronic device according to an implementation of the present application.

For example, the script summary can mainly include a script theme, a main plot, main characters, etc. The script theme can include campus, family, education and daily life, etc. The script summary and the photographing tasks can be obtained from the network scripts of the existing film and television drama works, or it can be a photographing template set artificially. Referring to FIG. 3, when the input keywords include: the words "dog" and "growth memorial", the matched script summary can be the script summary of the existing dog growth video found on the Internet, and the corresponding found photographing tasks can be presented in the form of a list, including: photographing a picture of a dog's birth, photographing a picture of a dog's meal, photographing a picture of a dog's nap, . . . and photographing a picture of a dog playing in a park on a sunny day, etc.

203. The electronic device extracts photographing background information from each photographing task and generates a corresponding trigger condition according to the photographing background information, and the trigger condition includes a time condition, a geographical condition and/or a meteorological condition.

204. The electronic device acquires current time, current geographical position and/or current weather, and detects whether the current time, the current geographical position and/or the current weather meet the trigger condition. If the trigger condition is met, the following act 205 is executed.

For example, the trigger condition can be directly set by the user or determined according to the photographing task. For instance, when the photographing task is to photograph a picture of a dog playing in a park on a sunny day, it is easy to infer that the photographing background information of the photographing task relates to the weather and location. In this case, the objective condition of a sunny day and a park can be taken as the trigger condition, and the meteorological information and the geographical position information of the environment in which the electronic device is located can be detected in real time. Only when the electronic device is in the park and the weather is just fine can the trigger condition be determined to be met.

205. The electronic device generates a prompt interface displaying the photographing tasks to prompt the user to start a camera for photographing.

Figure 4:
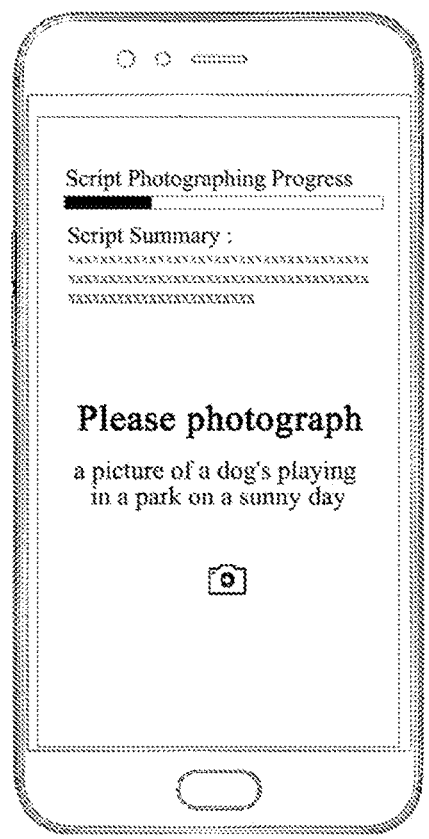
FIG. 4 is a schematic diagram of a prompt interface in an electronic device according to an implementation of the present application.

For example, reference may be made to FIG. 4. The prompt interface can include a script photographing progress display column, a script summary display column and the like in addition to a display column of the photographing task, so that the user can better understand the whole photographing content. Of course, in order to facilitate the user to quickly enter the photographing application for photographing, the prompt interface can also include a photographing application entry interface, and the entry interface can take the form of a camera icon.

206. When entering a photographing application, the electronic device acquires a current environment parameter, adjusts a photographing parameter of the electronic device according to the current environment parameter, and then performs photographing by using the adjusted photographing parameter.

For example, the environment parameter mainly includes ambient light brightness, light intensity and light contrast, etc. The photographing parameter mainly refers to exposure, filter type, color softness, etc. When the environment parameter is obtained, the parameter range to which the environment parameter belongs can be determined first, and then the corresponding photographing parameter can be acquired according to the determined parameter range. Different environment parameters generally correspond to different photographing parameters.

207. The electronic device splices the at least one photo according to photographing time to obtain an animation file, acquires an audio file set by the user, and then synthesizes the animation file and the audio file into a video file.

For example, an electronic device can first acquire an appropriate animation template according to the quantity of photos and then fill the photos into the animation template in a mapping mode. During the filling process, annotation words corresponding to the photographing task can also be generated on a static photo. For instance, when a certain photo is a photo of a dog's birth, words such as "birth" can be annotated on the photo.

From the above, it can be seen that the video producing method provided by the implementation is applied to an electronic device. In the method, an electronic device can acquire keywords set by a user, wherein the keywords include a participant and a participation event. Then, the electronic device matches the keywords with preset at least one script summary, and search for corresponding multiple photographing tasks according to a script summary successfully matched. Then, the electronic device extracts photographing background information from each photographing task and generates a corresponding trigger condition according to the photographing background information, and the trigger condition includes a time condition, a geographical condition and/or a meteorological condition. Then, the electronic device acquires current time, current geographical position and/or current weather, and detects whether the current time, the current geographical position and/or the current weather meet the trigger condition. If the trigger condition is met, the electronic device generates a prompt interface displaying the photographing tasks to prompt the user to start a camera for photographing. Afterward, when entering a photographing application, the electronic device can acquire a current environment parameter, adjust a photographing parameter of the electronic device according to the current environment parameter, and then perform photographing by using the adjusted photographing parameter. Then, the electronic device splices the at least one photo according to photographing time to obtain an animation file, acquires an audio file set by the user, and then synthesizes the animation file and the audio file into a video file. Thereby, videos of various themes can be produced according to user requirements which are not limited to existing natural scene themes. The method is simple and flexible, and has a wide range of applications.

According to the method described in the above implementation, this implementation will be further described from the perspective of a video producing apparatus. The video producing apparatus can be specifically implemented as an independent entity or integrated in an electronic device, such as a terminal. The terminal can include a mobile phone, a tablet computer, a personal computer, etc.

The implementation of the present application provides a video producing apparatus which is applied to an electronic device and includes: an acquiring module, a determining module, a prompting module, a prompting module, and a generating module.

The acquiring module is configured to acquire keywords set by a user, wherein the keywords include a participant and a participation event.

The determining module is configured to determine multiple photographing tasks and a trigger condition for each of the photographing tasks according to the keywords.

The prompting module is configured to prompt, according to the trigger condition, the user to perform photographing corresponding to a photographing task, so as to obtain at least one photo.

The generating module is configured to generate a video file according to the at least one photo.

In some implementations, the determining module is specifically configured to: match the keywords with preset at least one script summary; search for corresponding multiple photographing tasks according to a script summary successfully matched; and extract photographing background information from each photographing task, and generate a corresponding trigger condition according to the photographing background information.

In some implementations, the trigger condition includes a time condition, a geographical condition and/or a meteorological condition, and the prompting module is specifically configured to: acquire current time, current geographical position and/or current weather; detect whether the current time, the current geographical position and/or the current weather meet the trigger condition; and if so, generate a prompt interface displaying the photographing tasks to prompt the user to start a camera for photographing.

In some implementations, the video producing apparatus further includes an adjusting module, configured to: acquire a current environment parameter after the prompt interface displaying the photographing task is generated; determine a photographing parameter of the electronic device according to current environment parameter; and perform photographing with the photographing parameter when the electronic device enters a photographing application.

In some implementations, the adjusting module is specifically configured to: determine a parameter range to which the current environment parameter belongs; and acquire a corresponding photographing parameter according to the determined parameter range.

In some implementations, the generating module is specifically configured to: splice the at least one photo according to photographing time to obtain an animation file; acquire an audio file set by the user; and synthesize the animation file and the audio file into a video file.

In some implementations, the generating module is specifically configured to: determine the quantity of the at least one photo; select an animation template corresponding to the quantity; and fill the at least one photo into the animation template in a mapping mode.

Figure 5:
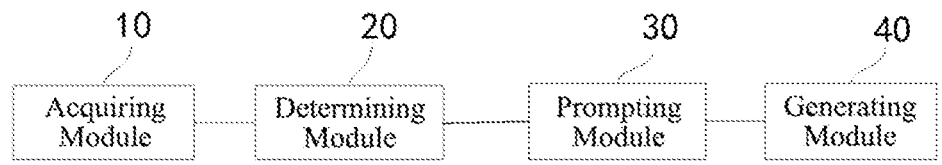
FIG. 5 is a schematic diagram of a structure of a video producing apparatus according to an implementation of the present application.

Please refer to FIG. 5, FIG. 5 specifically describes a video producing apparatus according to an implementation of the present application, and the apparatus is applied to an electronic device. The video producing apparatus may include an acquiring module 10, a determining module 20, a prompting module 30 and a generating module 40:

(1) Acquiring Module 10

The acquiring module 10 is configured to acquire keywords set by a user, wherein the keywords include a participant and a participation event.

In the implementation, the keywords are set by the user according to requirements and mainly used to summarize the subject content of the script to be photographed. The participation event may include: growth memorial, travel memorial, dog walking, wedding memorial, etc. The participant mainly refers to the photographed object, such as a child, a parent, a puppy, or another character or animal.

(2) Determining Module 20

The determining module 20 is configured to determining multiple photographing tasks and a trigger condition for each of the photographing tasks according to the keywords.

For example, the determining module 20 can be specifically configured to: match the keywords with preset at least one script summary; search for corresponding multiple photographing tasks according to a script summary successfully matched; and extracting photographing background information from each photographing task, and generating a corresponding trigger condition according to the photographing background information.

In the implementation, the script summary is mainly used for briefly describing the main contents of the script, which may include a script theme, a main plot, main characters, etc. The script summary and the photographing tasks can be obtained from the network scripts of the existing film and television drama works, or it can be a photographing template set artificially. The photographing background information may include weather, age, location, etc. For example, when a photographing task is to photograph a picture of a baby crawling at the age of one year, the extracted background information may be 1 year old. In this case, for this photographing script, the user may be required to input the actual age of the baby in advance, the timing function may be turned on, and the interval between the actual age and 1 year old may be taken as the timing duration satisfying the condition to generate a trigger condition.

(3) Prompting Module 30

The prompting module 30 is configured to prompt, according to the trigger condition, the user to perform photographing corresponding to a photographing task, so as to obtain at least one photo.

For example, the trigger condition includes a time condition, a geographical condition and/or a meteorological condition. The prompting module is specifically configured to: acquire current time, current geographical position and/or current weather; detecting whether the current time, the current geographical position and/or the current weather meet the trigger condition; and if yes, generating a prompt interface displaying the photographing tasks to prompt the user to start a camera for photographing.

In the implementation, the trigger condition may be related to time, place and/or weather, which may be directly set by the user or determined according to the photographing tasks. For example, the time may be July 31 each year, the place may be a park or cafe, the weather may be sunny or rainy, etc., and the detail depends on the actual needs of the user. When the trigger condition is met, an electronic device can automatically generate a prompt interface. The prompt interface can include a script photographing progress display column, a script summary display column and the like in addition to a display column of the photographing task, so that the user can better understand the whole photographing content. Of course, in order to facilitate the user to quickly enter the photographing application for photographing, the prompt interface can also include a photographing application entry interface, and the entry interface can take the form of a camera icon and the like.

It is easy to understand that, since the user is not convenient for photographing every time the prompt interface is displayed, when it is detected that the user has rejected photographing of the current photographing task, a selection box for determining the next prompt time can be provided for the user to select a suitable time for photographing again.

The next prompt time in the selection box can be set by default, for example, one hour later, tomorrow or two days later, or it can be randomly set by the user according to his own situation. After it has been set, the electronic device will start the timing function.

Figure 6:
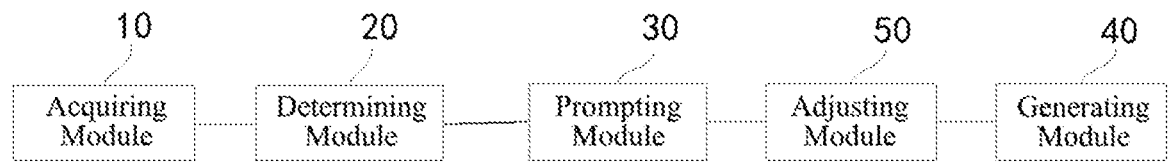
FIG. 6 is a schematic diagram of another structure of a video producing apparatus according to an implementation of the present application.

In addition, when the electronic device enters the photographing application for photographing, the photographing parameter can also be automatically adjusted according to the brightness of the ambient light. In other words, reference may be made to FIG. 6. The video producing apparatus may further include an adjusting module 50, configured to: after the prompting module 30 generates the prompt interface displaying the photographing task, acquire a current environment parameter when an electronic device enters a photographing application; adjust a photographing parameter of the electronic device according to current environment parameter; and perform photographing by using the adjusted photographing parameter.

In the implementation, the environment parameter mainly includes natural factors that affect the photographing effect, such as ambient light brightness, light intensity and light contrast, etc. The photographing parameter mainly refers to exposure, filter type, color softness, etc. When the environment parameter is obtained, the parameter range to which the environment parameter belongs can be determined first, and then the corresponding photographing parameter can be obtained according to the determined parameter range.

(4) Generating Module 40

The generating module 40 is configured to generate a video file according to the at least one photo.

For example, the above generating module 40 can be specifically configured to: splice the at least one photo according to photographing time to obtain an animation file; acquire an audio file set by the user; and synthesize the animation file and the audio file into a video file.

In the implementation, when it is detected that all photographing tasks have been completed, the electronic device can automatically and sequentially splice static photos into a dynamic animation file according to the photographing time. Specifically, an appropriate animation template can be acquired according to the quantity of photos, and then the photos are filled into the animation template in a mapping mode. Of course, during the filling process, annotation words about the photographing task can also be generated on a static photo. For instance, when a certain photo is a photo of a baby crawling at one year old, words such as "1 year old" can be annotated on the photo. The audio file can be downloaded by the user on the Internet or recorded by the user himself.

In the specific implementation, the above units may be implemented as separate entities, or may be combined in any way and implemented as one or several entities. For the specification implementation of the above units, reference can be made to the foregoing method implementation, and details are not repeated herein.

From the above, it can be seen that the video producing apparatus provided by the implementation is applied to an electronic device. The acquiring module 10 acquires keywords set by a user, wherein the keywords include a participant and a participation event. The determining module 20 determines multiple photographing tasks and a trigger condition for each of the photographing tasks according to the keywords. Afterward, the prompting module 30 prompts, according to the trigger condition, the user to perform photographing corresponding to a photographing task, so as to obtain at least one photo. The generating module 40 generates a video file according to the at least one photo.

Thereby, videos of various themes can be produced according to user requirements. The method is simple and flexible.

Figure 7:
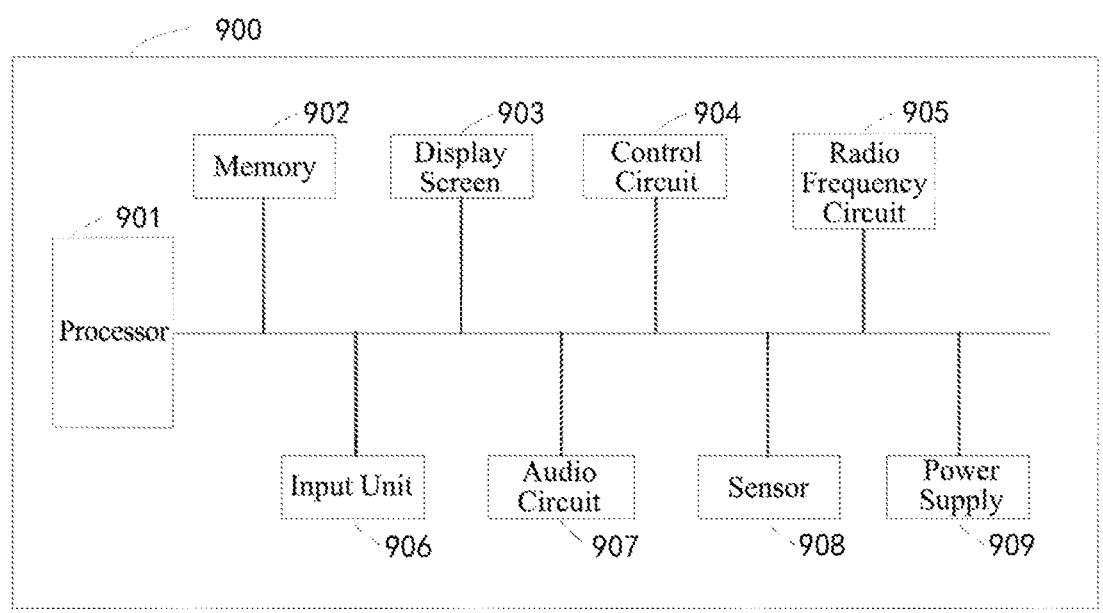
FIG. 7 is a schematic diagram of a structure of an electronic device according to an implementation of the present application.

In addition, an implementation of the present application also provides an electronic device, and the electronic device can be a device such as a smart phone or a tablet computer. As shown in FIG. 7, the electronic device 900 includes a processor 901, a memory 902, a display screen 903, and a control circuit 904. The processor 901 is electrically connected to the memory 902, the display screen 903 and the control circuit 904, respectively.

The processor 901 is a control center of the electronic device 900, and is connected with various parts of the entire electronic device by using various interfaces and lines. By running or loading application programs stored in the memory 902 and by calling data stored in the memory 902, the processor 901 performs various functions of the electronic device and processes the data, so as to perform overall monitoring on the electronic device.

In this implementation, the processor 901 in the electronic device 900 loads the instructions corresponding to the processes of one or more application programs into the memory 902 according to the following acts, and the processor 901 runs the application programs stored in the memory 902, thereby realizing various functions: keywords set by a user are acquired, wherein the keywords include a participant and a participation event.

Multiple photographing tasks and a trigger condition for each of the photographing tasks are determined according to the keywords.

The user is, according to the trigger condition, prompted to perform photographing corresponding to a photographing task so as to obtain at least one photo.

A video file is generated according to the at least one photo.

In some implementations, determining the multiple photographing tasks and the trigger condition for each of the photographing tasks according to the keywords include: matching the keywords with preset at least one script summary; searching for corresponding multiple photographing tasks according to a script summary successfully matched; and extracting photographing background information from each photographing task, and generating a corresponding trigger condition according to the photographing background information.

In some implementations, the trigger condition includes a time condition, a geographical condition and/or a meteorological condition, and prompting, according to the trigger condition, the user to perform photographing corresponding to the photographing task includes: acquiring current time, current geographical position and/or current weather; detecting whether the current time, the current geographical position and/or the current weather meet the trigger condition; and if yes, generating a prompt interface displaying the photographing tasks to prompt the user to start a camera for photographing.

In some implementations, after generating the prompt interface displaying the photographing task, the acts further include: acquiring a current environment parameter; determining a photographing parameter of the electronic device according to current environment parameter; and performing photographing with the photographing parameter when the electronic device enters a photographing application.

In some implementations, determining the photographing parameter of the electronic device according to current environment parameter includes: determining a parameter range to which the current environment parameter belongs; and acquiring a corresponding photographing parameter according to the determined parameter range.

In some implementations, generating the video file according to the at least one photo includes: splicing the at least one photo according to photographing time to obtain an animation file; acquiring an audio file set by the user; and synthesizing the animation file and the audio file into a video file.

In some implementations, splicing the at least one photo according to the photographing time includes: determining the quantity of the at least one photo; selecting an animation template corresponding to the quantity; and filling the at least one photo into the animation template in a mapping mode.

The memory 902 can be configured to store application programs and data. The application programs stored in the memory 902 includes instructions executable in the processor. The application programs can form various functional modules. The processor 901 executes various functional applications and data processing by running application programs stored in the memory 902.

The display screen 903 may be configured to display information input by the user or information provided to the user and various graphical user interfaces of the terminal. The various graphical user interfaces are composed of graphics, text, icons, video, and any combination thereof.

The control circuit 904 is electrically connected to the display screen 903 for controlling the display screen 903 to display information.

In some implementations, as shown in FIG. 7, the electronic device 900 further includes a radio frequency circuit 905, an input unit 906, an audio circuit 907, a sensor 908, and a power supply 909. The processor 901 is electrically connected to a radio frequency circuit 905, an input unit 906, an audio circuit 907, a sensor 908, and a power supply 909, respectively.

The radio frequency circuit 905 is configured to transmit and receive radio frequency signals to establish wireless communication with network devices or other electronic devices, and transmit and receive signals to/from network devices or other electronic devices.

The input unit 906 may be configured to receive input numbers, character information or user characteristic information (e.g., fingerprints), and generate keyboard, mouse, joystick, optical or trackball signal inputs related to the user setting and function control. The input unit 906 may include a fingerprint identification module.

The audio circuit 907 may be configured to provide an audio interface between the user and the terminal through speakers and microphones.

The electronic device 900 may further include at least one sensor 908, such as an optical sensor, a motion sensor or other sensor. Specifically, the optical sensor may include an ambient light sensor and a proximity sensor, wherein the ambient light sensor may adjust luminance of the display panel according to brightness of the ambient light, and the proximity sensor may turn off the display panel and/or backlight when the terminal is moved near the ear. As one type of the motion sensor, a gravity acceleration sensor may detect magnitudes of accelerations in various directions (generally triaxial directions), may detect the magnitude and direction of the gravity when the sensor is still, may be used in an application for identifying a gesture of a mobile phone (for example, switching between landscape and portrait, related games, and gesture calibration of a magnetometer), and a function related to vibration identification (such as a pedometer and a tap), and the like. Other sensors, for example, a gyroscope, a barometer, a hygrometer, a thermometer, and an infrared sensor, which may be further configured in the terminal are not described repeatedly herein.

The power supply 909 is configured to supply power to various components of the electronic device 900. In some implementations, the power supply 909 may be logically connected to the processor 901 through a power management system, thereby realizing functions such as managing charging and discharging, and managing power consumption through the power management system.

The electronic device 900 may further include a camera, a bluetooth module, and so on, which are not shown in FIG. 7 and not described herein.

One of ordinary skill in the art may understand that all or a part of the acts in the various methods of the above implementations can be completed by instructions, or by instructions controlling related hardware. The instructions may be stored in a computer readable storage medium and loaded and executed by a processor. For this reason, an implementation of the present disclosure provides a storage medium in which multiple instructions are stored, and the instructions can be loaded by a processor to execute the acts in any video producing method provided by the implementations of the present disclosure.

The storage medium may include: a read-only memory (ROM), a random access memory (RAM), a magnetic disk, or an optical disk.

Since the instructions stored in the storage medium can execute the acts in any video producing method provided by the implementations of the present disclosure, the beneficial effects that can be realized by any video producing method provided by the implementation of the present disclosure can be realized. For details, please refer to the previous implementations and will not be repeated here.

The specific implementation of the above operations may refer to the above implementations, and details are omitted herein.

To sum up, although the present application has been disclosed in terms of the preferred implementation, the above preferred implementation is not intended to limit the present application. Those skilled in the art can make various changes and modifications without departing from the spirit and scope of the present application. Therefore, the scope of protection of the present application shall be as defined in the claims.

What is claimed is:

1. A video producing method, applied to an electronic device, comprising:
   acquiring keywords set by a user, wherein the keywords comprise a participant and a participation even;
   determining multiple photographing tasks and a trigger condition for each of the photographing tasks according to the keywords;
   prompting, according to the trigger condition, the user to perform photographing corresponding to a photographing task, so as to obtain plurality of photos; and
   generating a video file according to the plurality of photos,
   wherein the trigger condition comprises a time condition, a geographical condition and/or a weather condition,
   if the trigger condition is met, generating a prompt interface displaying the photographing tasks to prompt the user to start a camera for photographing.

2. The video producing method according to claim 1, wherein determining the multiple photographing tasks and the trigger condition for each of the photographing tasks according to the keywords comprises:
   matching the keywords with at least one preset script summary;
   searching for corresponding multiple photographing tasks according to a script summary successfully matched;
   extracting photographing background information from each photographing task; and
   generating a corresponding trigger condition according to the photographing background information.

3. The video producing method according to claim 1, wherein prompting, according to the trigger condition, the user to perform photographing corresponding to the photographing task comprises:
   acquiring current time, current geographical position and/or current weather;
   detecting whether the current time, the current geographical position and/or the current weather meet the trigger condition.

4. The video producing method according to claim 3, wherein, after generating the prompt interface displaying the photographing task, the method further comprises:
   acquiring a current environment parameter;
   determining a photographing parameter of the electronic device according to the current environment parameter; and
   performing photographing with the photographing parameter when the electronic device enters a photographing application.

5. The video producing method according to claim 4, wherein determining the photographing parameter of the electronic device according to current environment parameter comprises:
   determining a parameter range to which the current environment parameter belongs; and
   acquiring a corresponding photographing parameter according to the determined parameter range.

6. The video producing method according to claim 1, wherein generating the video file according to the plurality of photos comprises:
   splicing the plurality of photos according to photographing time to obtain an animation file;
   acquiring an audio file set by the user; and
   synthesizing the animation file and the audio file into a video file.

7. The video producing method according to claim 6, wherein splicing the plurality of photos according to the photographing time comprises:
   determining a quantity of the plurality of photos;
   selecting an animation template corresponding to the quantity; and
   filling the plurality of photos into the animation template in a mapping mode.

8. A non-transitory storage medium, wherein multiple instructions are stored in the storage medium, and the instructions are configured to be loaded by a processor to execute the video producing method of claim 1.

9. An electronic device, comprising a processor and a memory, wherein the processor is electrically connected to the memory, the memory is configured to store instructions and data, and the processor is configured to:
   acquire keywords set by a user, wherein the keywords comprise a participant and a participation event;
   determine multiple photographing tasks and a trigger condition for each of the photographing tasks according to the keywords;

prompt, according to the trigger condition, the user to perform photographing corresponding to a photographing task, so as to obtain a plurality of photos; and
generate a video file according to the plurality of photos, wherein the trigger condition comprises a time condition, a geographical condition and/or a weather condition,
if the trigger condition is met, generate a prompt interface displaying the photographing tasks to prompt the user to start a camera for photographing.

10. The electronic device according to claim 9, wherein the processor is further configured to:
match the keywords with at least one preset script summary;
search for corresponding multiple photographing tasks according to a script summary successfully matched; and
extract photographing background information from each photographing task; and
generate a corresponding trigger condition according to the photographing background information.

11. The electronic device according to claim 9, wherein the processor is further configured to:
acquire current time, current geographical position and/or the current weather;
detect whether the current time, the current geographical position and/or the current weather meet the trigger condition.

12. The electronic device according to claim 11, wherein after the prompt interface displaying the photographing task is generated, the processor is further configured to:
acquire a current environment parameter;
determine a photographing parameter of the electronic device according to the current environment parameter; and
perform photographing with the photographing parameter when the electronic device enters a photographing application.

13. The electronic device according to claim 12, wherein the processor is further configured to:
determine a parameter range to which the current environment parameter belongs; and
acquire a corresponding photographing parameter according to the determined parameter range.

14. The electronic device according to claim 9, wherein the processor is further configured to:
splice the plurality of photos according to photographing time to obtain an animation file;
acquire an audio file set by the user; and
synthesize the animation file and the audio file into a video file.

15. The electronic device according to claim 14, wherein the processor is further configured to:
determine a quantity of the plurality of photos;
select an animation template corresponding to the quantity; and
fill the plurality of photos into the animation template in a mapping mode.

\* \* \* \* \*